US012808996B2

(12) United States Patent
Nootz et al.

(10) Patent No.: US 12,808,996 B2
(45) Date of Patent: Nov. 24, 2026

(54) 360 DEGREE LiDAR SYSTEM FOR UNDERWATER VEHICLES

(71) Applicants: Gero Nootz, Slidell, LA (US); Walter Britton, Lox, FL (US); Fraser Dalgleish, Vero Beach, FL (US)

(72) Inventors: Gero Nootz, Slidell, LA (US); Walter Britton, Lox, FL (US); Fraser Dalgleish, Vero Beach, FL (US)

(73) Assignees: University of Southern Mississippi, Hattiesburg, MS (US); BeamSea Associates, LLC, Loxahatchee Groves, FL (US)

( * ) Notice: Subject to any disclaimer, the term of this patent is extended or adjusted under 35 U.S.C. 154(b) by 1082 days.

(21) Appl. No.: 17/716,871

(22) Filed: Apr. 8, 2022

(65) Prior Publication Data

US 2022/0326356 A1 Oct. 13, 2022

Related U.S. Application Data

(60) Provisional application No. 63/172,481, filed on Apr. 8, 2021.

(51) Int. Cl.

| | |
|---|---|
| ***G01S 7/481*** | (2006.01) |
| ***G01S 17/42*** | (2006.01) |
| ***G01S 17/894*** | (2020.01) |

(52) U.S. Cl.
CPC .......... *G01S 7/4817* (2013.01); *G01S 7/4813* (2013.01); *G01S 17/42* (2013.01); *G01S 17/894* (2020.01)

(58) Field of Classification Search
CPC ............................ G01S 7/4817; G01S 7/4813
See application file for complete search history.

(56) References Cited

U.S. PATENT DOCUMENTS 8,108,147 B1 * 1/2012 Blackburn ............ G08G 1/166 382/104
9,702,966 B2 7/2017 Batcheller et al.
(Continued)

FOREIGN PATENT DOCUMENTS

EP 3553565 A1 10/2019
KR 20180011510 A * 2/2018 ........... H01S 3/1024
(Continued)

OTHER PUBLICATIONS

KR-20180011510-A, Kim, Feb. 2, 2018, English Version.*
(Continued)

*Primary Examiner* — Yuqing Xiao
(74) *Attorney, Agent, or Firm* — Butler Snow LLP; Jon E. Holland

(57) ABSTRACT

An omnidirectional imaging system includes a housing have at least one transparent portion, a light source configured to produce emitted light, a transmitter configured to direct the emitted light outward of the housing through the at least one transparent portion at a 360 degree scanning angle range measured about an axis, and a receiver configured to receive the emitted light. The receiver is configured to receive the emitted light and generate a cylindrical 3D point cloud centered along a path of motion of the housing, wherein the housing moves along the axis of rotation of the emitted light.

23 Claims, 13 Drawing Sheets

(56) References Cited

U.S. PATENT DOCUMENTS

| | | | | |
|---|---|---|---|---|
| 2014/0204385 | A1 * | 7/2014 | Ouyang | G01N 21/55 356/445 |
| 2015/0185313 | A1 | 7/2015 | Zhu | |
| 2016/0198069 | A1 | 7/2016 | Boyle et al. | |
| 2017/0356796 | A1 * | 12/2017 | Nishio | G01J 1/18 |
| 2019/0127034 | A1 | 5/2019 | Larson et al. | |
| 2019/0146091 | A1 | 5/2019 | Matsko et al. | |
| 2019/0227175 | A1 * | 7/2019 | Steinberg | G01S 17/89 |
| 2021/0255323 | A1 * | 8/2021 | Lundquist | G01S 17/89 |
| 2021/0278541 | A1 * | 9/2021 | Thoren | G01S 17/10 |
| 2022/0102018 | A1 * | 3/2022 | Embry | G01S 17/89 |

FOREIGN PATENT DOCUMENTS

| | | | | |
|---|---|---|---|---|
| WO | 2013157977 | A1 | 10/2013 | |
| WO | WO-2020021339 | A2 * | 1/2020 | G01S 7/4816 |

OTHER PUBLICATIONS

Tokyo University of Marine Science and Technology Tokyo, Japan "Sea urchin survey by small ROV" 2018.

Mina Sorial, Issa Mouawad, Enrico Simetti, Francesca Odone, Giuseppe Casalino DIBRIS, University of Genova, Via Opera Pia 13, 16145 Genova, Italy "Towards a Real Time Obstacle Detection System for Unmanned Surface Vehicles" 2019.

Michael DeFilippo, Paul Robinette, Michael Sacarny, Michael R. Benjamin "The Remote Explorer IV: An Autonomous Vessel for Oceanographic Research" 2019.

* cited by examiner

3D Reconstruction

360 DEGREE LiDAR SYSTEM FOR UNDERWATER VEHICLES

CROSS-REFERENCE TO RELATED APPLICATION

This application claims priority to U.S. Application No. 63/172,481 to Gero Nootz et al. filed on Apr. 8, 2021, the contents of which are incorporated herein by reference in their entirety.

STATEMENT OF FEDERALLY SPONSORED RESEARCH OR DEVELOPMENT

This invention was made with government support under the U.S. Office of Naval Research (ONR) Grant/Contract No. N00014-18-9-001. The government has certain rights in the invention.

FIELD

The present subject matter generally relates to a lidar system for underwater vehicles and more specifically to a 360 degree lidar system for underwater vehicles.

BACKGROUND

Underwater environments can present scenarios where the acquisition of image data through the field of view is limited, which can complicate underwater surveillance when using presently-available imaging systems. For example, the presence of a large number of suspended particles in the field of view may create significant backscattering of light and/or contribute to transmission loss of imaging data and acquisition of that data. Additionally, data acquisition from a direction and dimensional perspective is limited. The underwater environment presents challenges for traditional imaging application since objects of interest can be located anywhere within the water column. However, state-of-the-art camera based, Laser based, or caustically based imaging systems are typically configured to only capture the ocean floor and allow the acquisition of data from one direction rather than from anywhere within the water column as is typical for.

Recent advances in both acoustics and optical imaging technology, coupled with advances in signal and image processing, have enabled oceanographers to acquire and process images and videos that were unthinkable in years past. Acoustic imaging technologies have been used to gather oceanic images of objects in turbid oceanic environments that are challenging for optical systems. While acoustical systems have a longer imaging range as compared to optical system, their resolution is significantly lower than that of optical systems. Optical systems are useful in environments that are less turbid since they can have superior resolution and offer contrast based on the optical reflectivity of objects.

The shortcomings of both systems for acquiring and processing high-quality images in underwater environments creates the need for the development of technologies that will enable image acquisition and processing that are low power, reasonable in cost, and unobtrusive.

Advanced imaging technologies vastly improve and broaden the utility of unmanned systems. In particular, the application of advancements in underwater laser line scan (LLS) serial imaging sensors and Light Detection and ranging (LiDAR) have enabled optical imaging in turbid waters where imaging was not previously feasible. Additionally, these platforms have been employed for imaging applications for autonomous underwater vehicles (AUVs) and remotely operated underwater vehicles (ROVs) to enable characterization of underwater structures as well as the seafloor for military and civil applications.

LLS systems have many benefits, including high resolution in some environments where other scanning methods are not feasible, high capture speed, and surface topography scanning, but there are some disadvantages to using these systems for certain applications particularly under poor water visibility. Pulsed laser-based imaging systems show promise for imaging at extended range due to their ability to reject volume scattering compared to camera based systems. However, none of these systems offers the promise of omnidirectional imaging.

BRIEF DESCRIPTION

Aspects and advantages of the invention will be set forth in part in the following description, or may be obvious from the description, or may be learned through practice of the invention.

According to some aspects of the present disclosure, an omnidirectional imaging system includes a housing have at least one transparent portion, a transmitter configured to direct emitted light outward of the housing through the at least one transparent portion at a 360 degree scanning angle measured about an axis, and a receiver configured to receive the emitted light. The receiver is configured to receive the emitted light and generate a cylindrical 3D point cloud centered along a path of the housing as the housing moves in a first direction. The at least one transparent portion may be two transparent portions and/or the housing may be a cylindrical housing.

According to some aspects of the present disclosure, an omnidirectional imaging system includes a housing having at least one transparent portion, a light source, and at least one monogon laser scanner configured to rotate about an axis. The at least one monogon laser scanner is configured to redirect emitted light from the light source outward through the at least one transparent portion to form a 360 degree scanning angle measured about the axis of motion of the system. A plurality of detectors are positioned in a circular arrangement about the axis. The plurality of detectors are configured to receive the emitted light from the light source as the housing is moved in a first direction to generate a cylindrical 3D point cloud centered along the axis of the system as the system moves in the first direction.

According to some aspects of the present disclosure, an omnidirectional imaging system includes a housing having at least one transparent portion, a light source, and a first monogon laser scanner configured to rotate about an axis motion of the system. The first monogon laser scanner is configured to redirect emitted light from the light source outward through the at least one transparent portion to form a 360 degree scanning angle measured about the first axis. A second synchronized monogon configured to direct the emitted light to a detector as the housing is moved in a first direction. The detector is configured to generate a cylindrical 3D point cloud centered along the axis of motion of the system as the system moves in the first direction.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
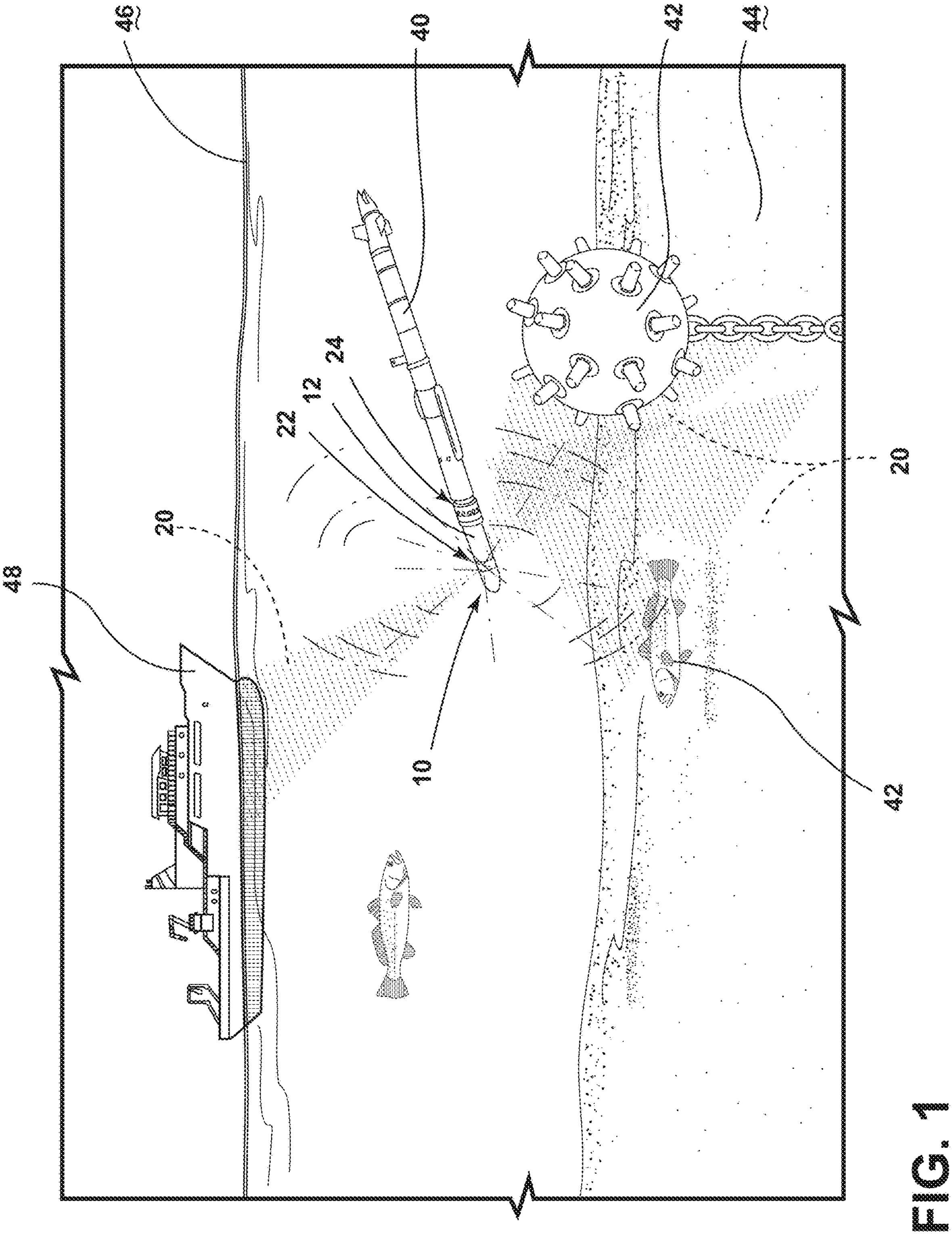
FIG. 1 illustrates a side perspective underwater view of a carry assembly including an omnidirectional imaging system, according to various examples.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an omnidirectional imaging system 10 configured as a 360 degree pulsed laser line scan imager (PLLS-360°) for underwater and/or surf zone bathymetry and other marine science applications. The omnidirectional imaging system 10 may include a housing 12 including at least one transparent portion 14, 16, a light source 18 configured to produce emitted light 20, a transmitter 22 configured to direct the emitted light 20 outward of the housing 12 and through the at least one transparent portion 14, 16 at a 360 degree scanning angle α measured about an axis of motion x of the system, and a receiver 24 configured to receive the emitted light 20. The receiver 24 is configured to receive the emitted light 20 and to generate a cylindrical 3D point cloud 26 centered along a path of the housing 12 (see arrow P of FIG. 7) as the system 10 moves in a first direction.

Referring now to FIG. 1, the imaging system 10 may be integrally formed with a carrying assembly 40, such as an underwater vehicle. The underwater vehicle may be an autonomous underwater vehicle (AUV) or may be any other underwater vehicle. Alternatively, the imaging system 10 may be coupled with the carrying assembly 40. The imaging system 10 may be configured to detect at least underwater target objects 42 (e.g., fish, hazards, etc.), the seafloor 44, the sea surface 46, and surface level target objects 48 (e.g., boats, platforms, etc.), as discussed in more detail elsewhere herein.

Figure 2:
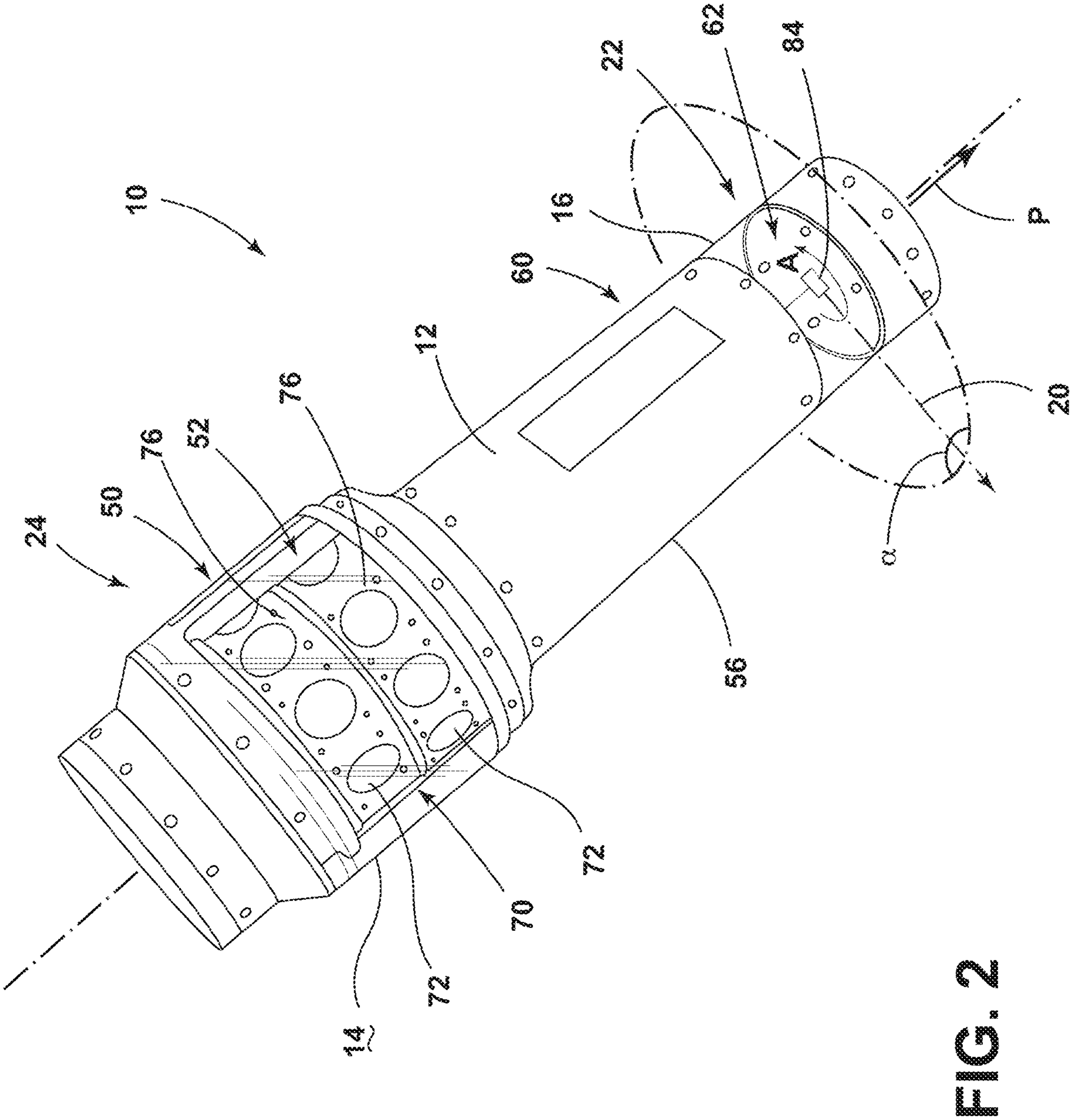
FIG. 2 is a side perspective view of an imaging system, according to various examples.
Figure 3:
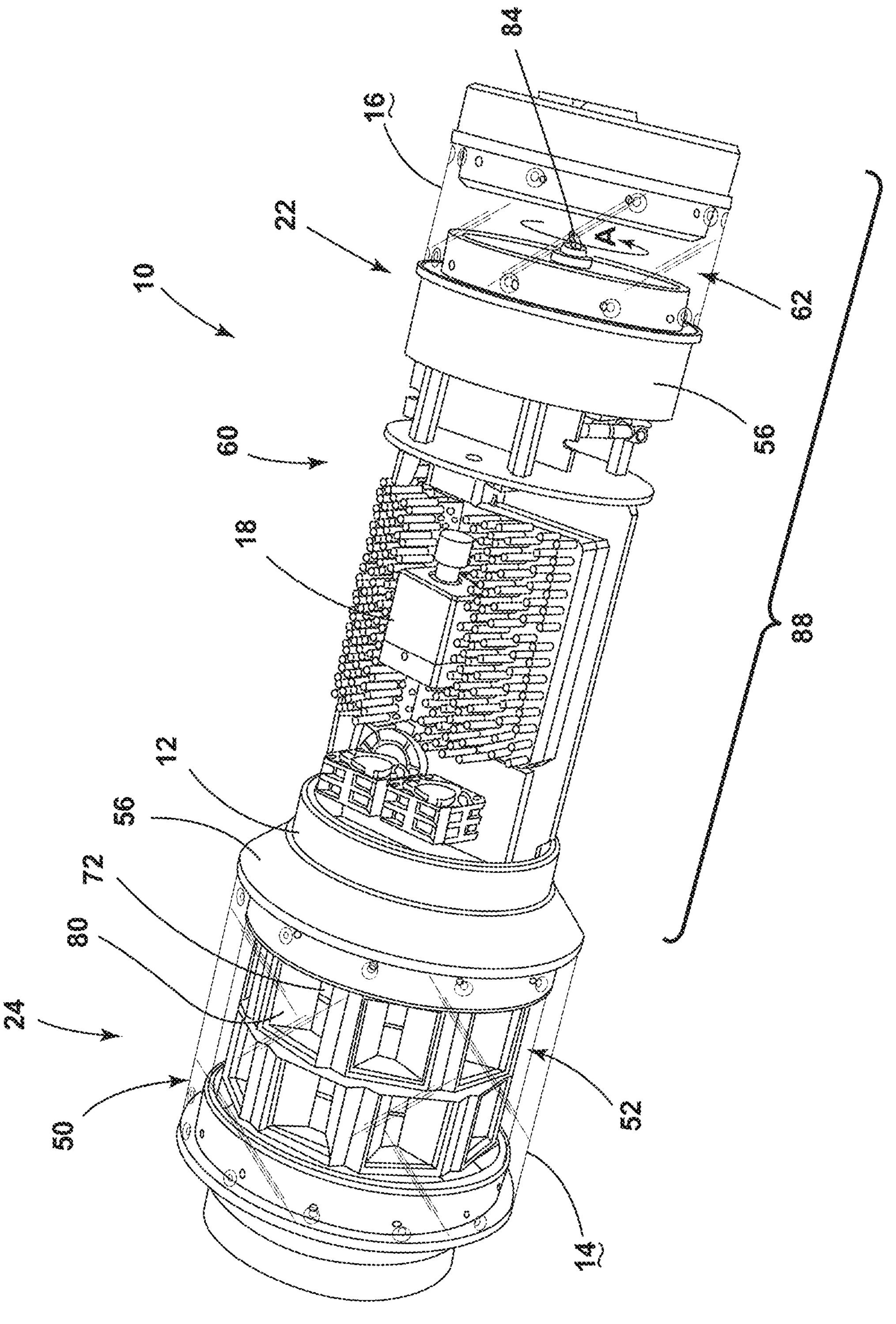
FIG. 3 is a side perspective view of an imaging system, according to various examples.
Figure 4:
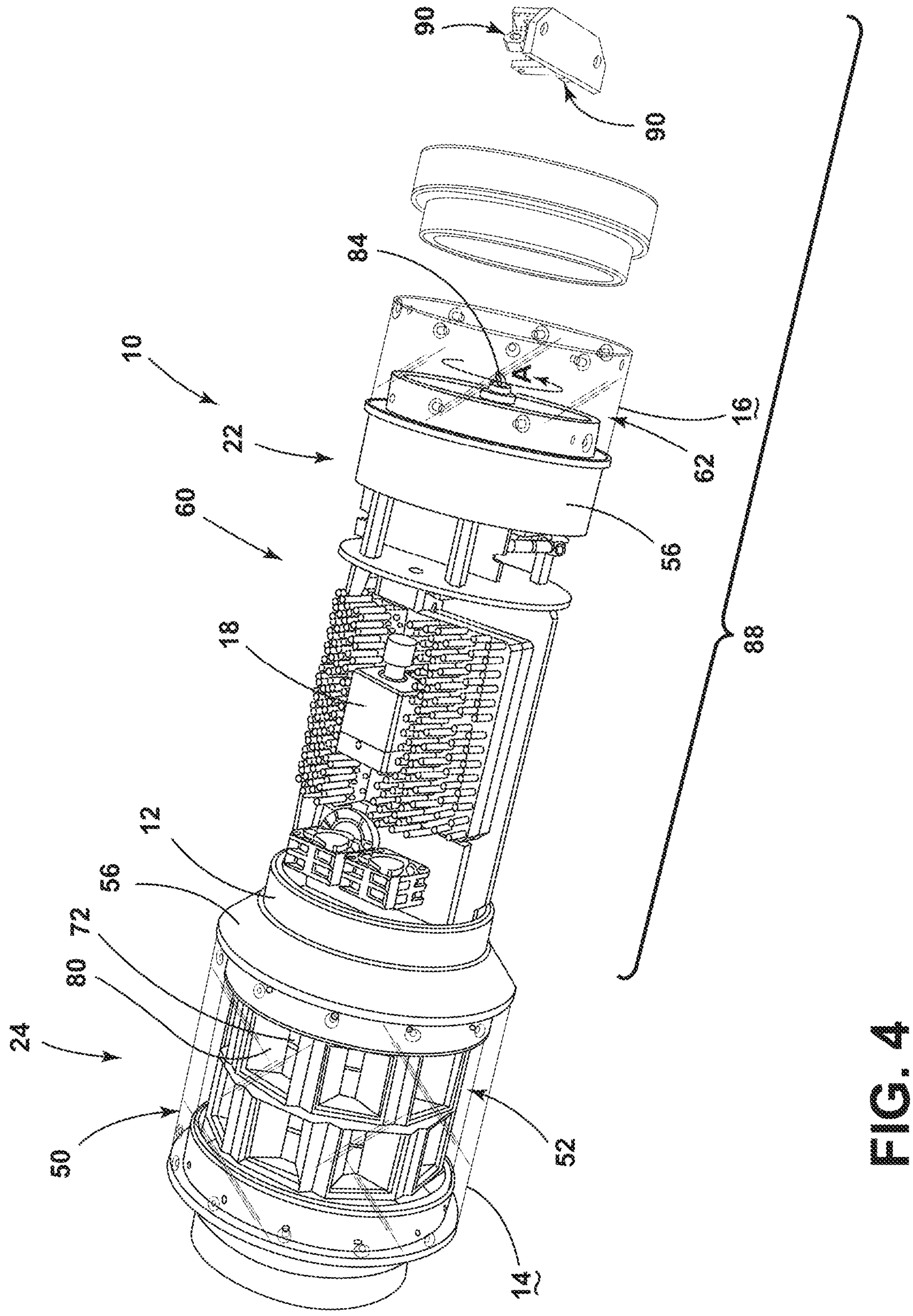
FIG. 4 is an exploded first side perspective view of the imaging system of FIG. 3.
Figure 5:
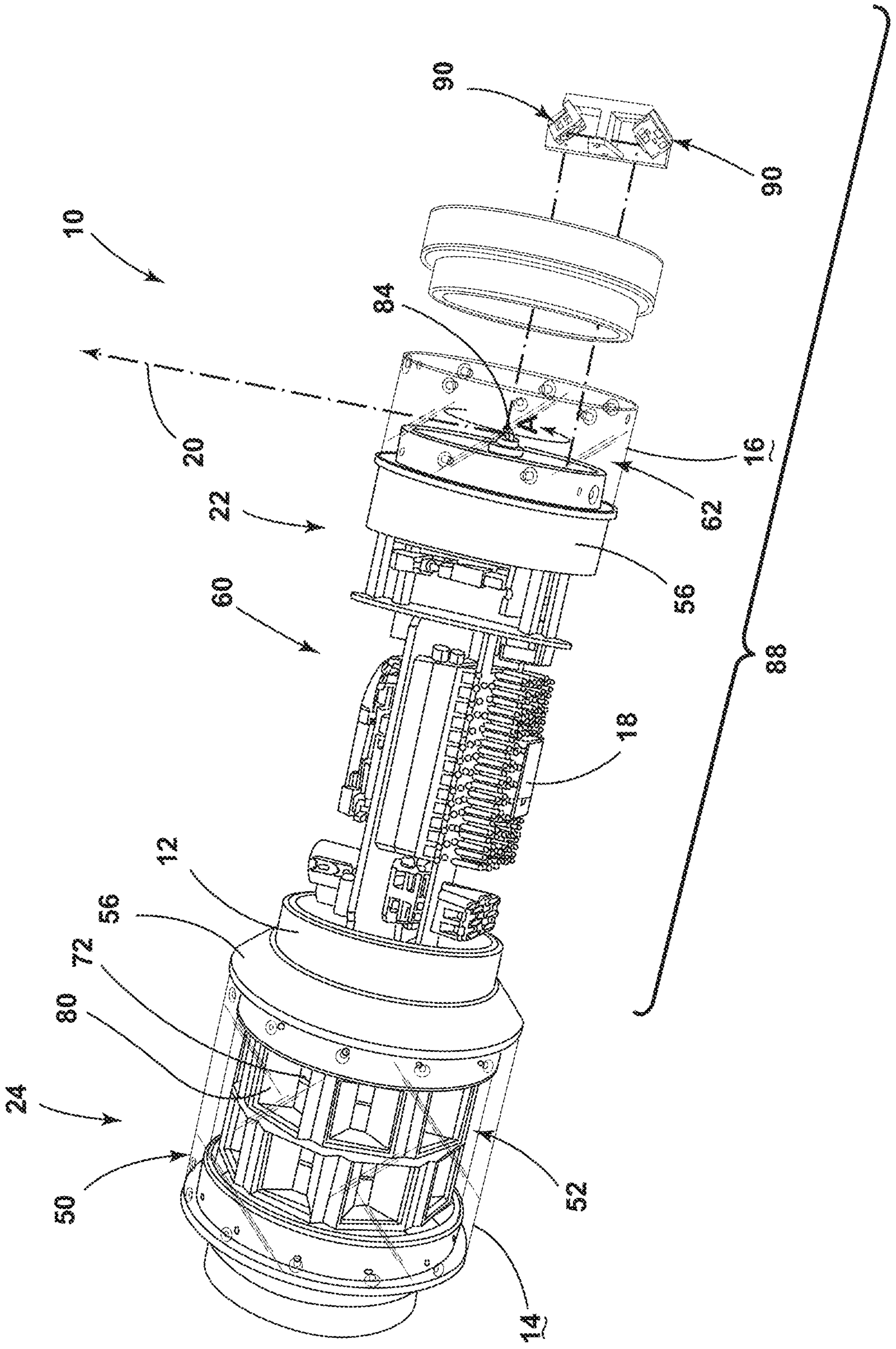
FIG. 5 is an exploded second side perspective view of the imaging system of FIG. 3 including emitted light from a light source.

Referring now to FIGS. 2-4, the imaging system 10 includes the housing 12 as previously introduced. In various examples, the housing 12 may be integrally formed with the carrying assembly 40. In other examples, the housing 12 may be separately formed and may be configured to be positioned on and/or coupled with the carrying assembly 40. For example, the imaging system 10 may use a transparent section of an underwater vehicle's hull as the housing 12.

The housing 12 may include an outer wall 56 defining at least a first cylindrical portion 50 defining a first cavity 52. The outer wall 56 may have a first transparent portion 14. The first transparent portion 14 is configured to extend about the entire circumference of the first cylindrical portion 50 to provide a full 360 degree view from the first cavity 52. The first transparent portion 14 may extend the full length of the first cylindrical portion 50 or the first transparent portion 14 may extend a portion of the length of the first cylindrical portion 50.

The housing 12 may further include a second cylindrical portion 60 defining a second cavity 62. The second cavity 62 may be at least partially formed by the outer wall 56 of the housing 12. As shown in FIG. 2, the second portion may have different dimensions than the first cylindrical portion 50. However, it is contemplated that the first and second portions 50, 60 of the housing 12 may be continuous and/or may have the same dimensions without departing from the scope of the present disclosure.

The outer wall 56 may have a second transparent portion 16 positioned proximate the second cavity 62. The second transparent portion 16 is configured to extend about the entire circumference of the second cylindrical portion 60 to provide a full 360 degree view from the second cavity 62. The second transparent portion 16 may extend the full length of the second cylindrical portion 60 or the second transparent portion 16 may extend a portion of the length of the second cylindrical portion 60. It is contemplated that the entirety of the outer wall 56 may be transparent. It is further contemplated that the outer wall 56 may have any number of transparent portions without departing from the scope of the present disclosure.

As previously introduced, the imaging system 10 includes a transmitter 22 and a receiver 24. The transmitter 22 and receiver 24 are selected such that the imaging system 10 is capable of detecting reflections from hard surfaces within the 360 degree field of view as well as from the volume scattering throughout the water column. As illustrated herein, the receiver 24 may be positioned within the first cavity 52 and the transmitter 22 may be positioned within the second cavity 62 for a bistatic configuration (i.e., the receiver 24 and the transmitter 22 are in different housings or different hull sections). This spatially separates the receiver 24 and the transmitter 22 and may reduce backscatter of the emitted light 20 from the common water volume formed between the transmitter 22 and the receiver 24 by the propagation of the emitted light 20 and the field of view of the receiver 24. Here common water volume refers to the volume of water that is shared between the emitted light 20 from the transmitter 22 and the field of view of the receiver 24. In addition, configurations with a multitude or plurality of both transmitters 22 and receivers 24 can be realized to reduce shadowing effects in a multistate configuration. However, it is contemplated that the receiver 24 and the transmitter 22 may be positioned within a single cavity in a monostatic configuration without departing from the scope of the present disclosure. In other words, in various examples, the transmitter 22 and the receiver 24 may be housed in the same portion of the housing 12 (or the same hull section) (e.g., within the first cavity 52) for a monostatic configuration.

As shown in FIGS. 2-4, the first cavity 52 may be configured to house the receiver 24. Referring now to FIG. 2, the receiver 24 may be at least one circular arrangement 70 of individual detectors 72, as previously introduced. The circular arrangement 70 may be electronically steered to provide the 360 degree field of view. The detectors 72 are positioned such that the field of view of the individual detectors 72 overlaps to form the 360 degree total field of view.

In various examples, the at least one circular arrangement 70 of individual detectors 72 may include one or more rows of detectors 72 arranged about a cylindrical support 76. The support 76 may be one of a plurality of supports 76 centered about the axis of motion x of the system 10. For example, each row of detectors 72 may be positioned on a separate support 76. Alternatively, each row of detectors 72 may be positioned on a single support 76. Where more than one support 76 is used, it is contemplated that the supports 76 may be operated independently or concurrently without departing from the scope of the present disclosure.

Alternatively, as shown in FIGS. 3 and 4, the first cavity 52 may be configured to house a receiver monogon 80. The receiver monogon 80 may be synchronized and may be configured to direct the emitted light 20 to a single detector 72. In other words, it is contemplated that a receiver synchronized monogon 80 may be used to direct the emitted light 20 to a single detector 72 without departing from the scope of the present disclosure.

With continued reference to FIGS. 2-4, the second cavity 62 may be configured to house the transmitter 22. The transmitter 22 may include a light source 18 and a transmitter monogon 84 configured to rotate about an axis x. In other words, the transmitter 22 may include at least one monogon laser scanner 88. The light source 18 may be positioned proximate the first transparent portion 14 of the outer wall 56 and is configured to produce an emitted light 20. The emitted light 20 is configured to be directed by the transmitter monogon 84 outward of the second cavity 62 through the second transparent portion 16 to form a 360 degree scanning angle α.

As shown in FIGS. 2 and 4, the 360 degree scanning angle α is produced by steering the emitted light 20 using the transmitter monogon 84 of the at least one monogon laser scanner 88. The transmitter monogon 84 of at least one monogon laser scanner 88 may be rotatably positioned within the second cavity 52. It is contemplated that, where the transmitter 22 includes more than one monogon laser scanner 88, multiple transmitter monogons 84 may be positioned within the second cavity 52. Emitted light 20 from the light source 18 is directed toward the monogon 84 of the at least one monogon laser scanner 88 and is steered by the rotation of the transmitter monogon 84 to create the 360 degree scanning angle α. In other words, the monogon laser scanner 22 is configured to direct emitted light 20 from the light source 18 outward of the first cavity 52 and through the first transparent portion 14 using rotation of the transmitter monogon 84 about arrow A.

As shown in FIG. 2, the emitted light 20 from the light source may be directed directly toward the transmitter monogon 84 of the at least one monogon laser scanner 88. In other examples, as shown in FIGS. 3 and 4, one or more lenses 90 may be used to redirect the emitted light 20 toward the transmitter monogon 84 of the at least one monogon laser scanner 88. It is contemplated that any number of lenses 90 may be used without departing from the scope of the present disclosure.

In some configurations, where a need exists for electronic components on both sides of the transmitter, wireless transmission of power and data can be utilized (e.g., via RF or optical link(s), for example). These configurations eliminate the otherwise needed wires, which may shield portions of the 360 degree field of view.

Figure 6:
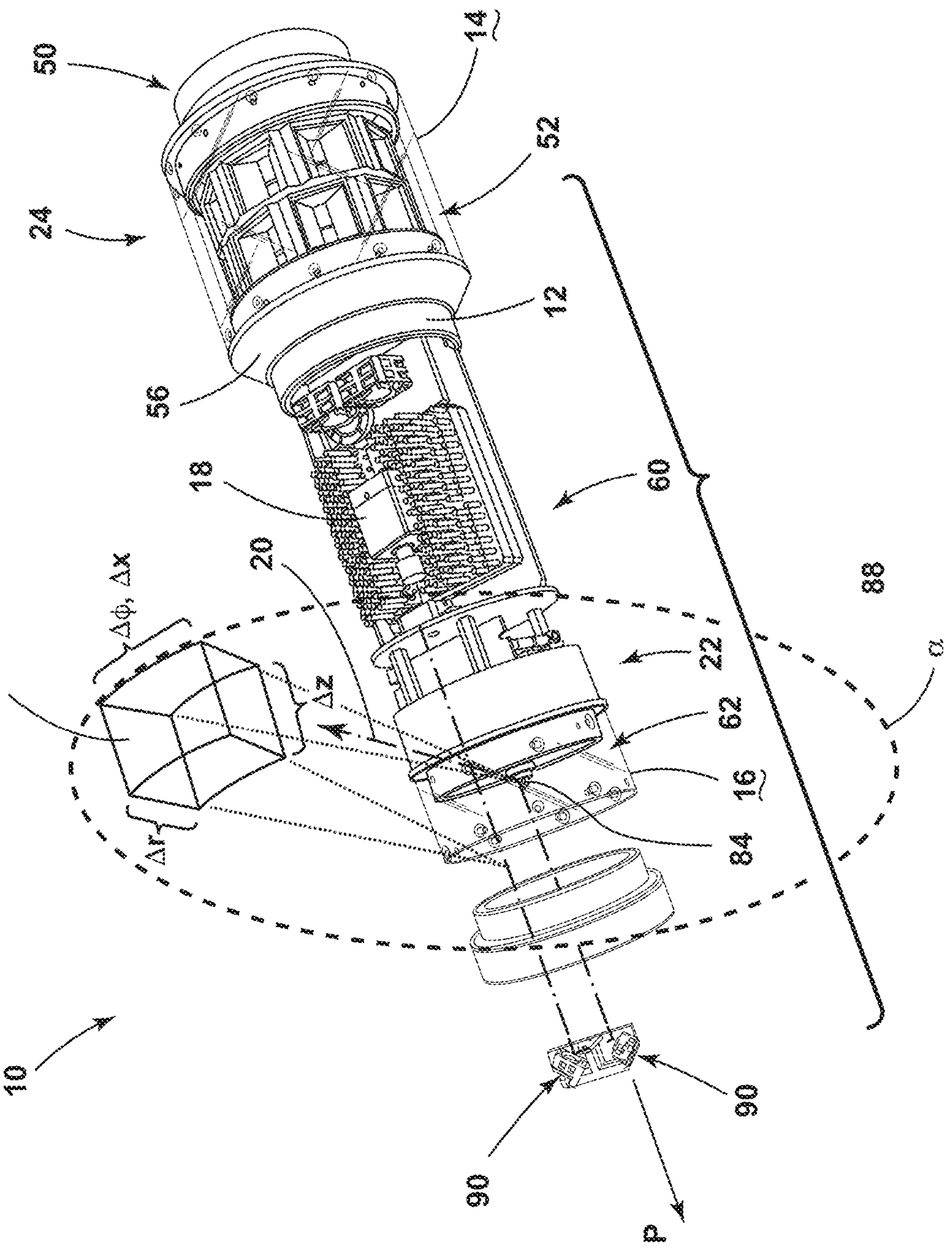
FIG. 6 is an exploded third side perspective view of the imaging system of FIG. 3 including a schematic representation of parameters and resolution information regarding the light source and a monogon laser scanner.
Figure 7:
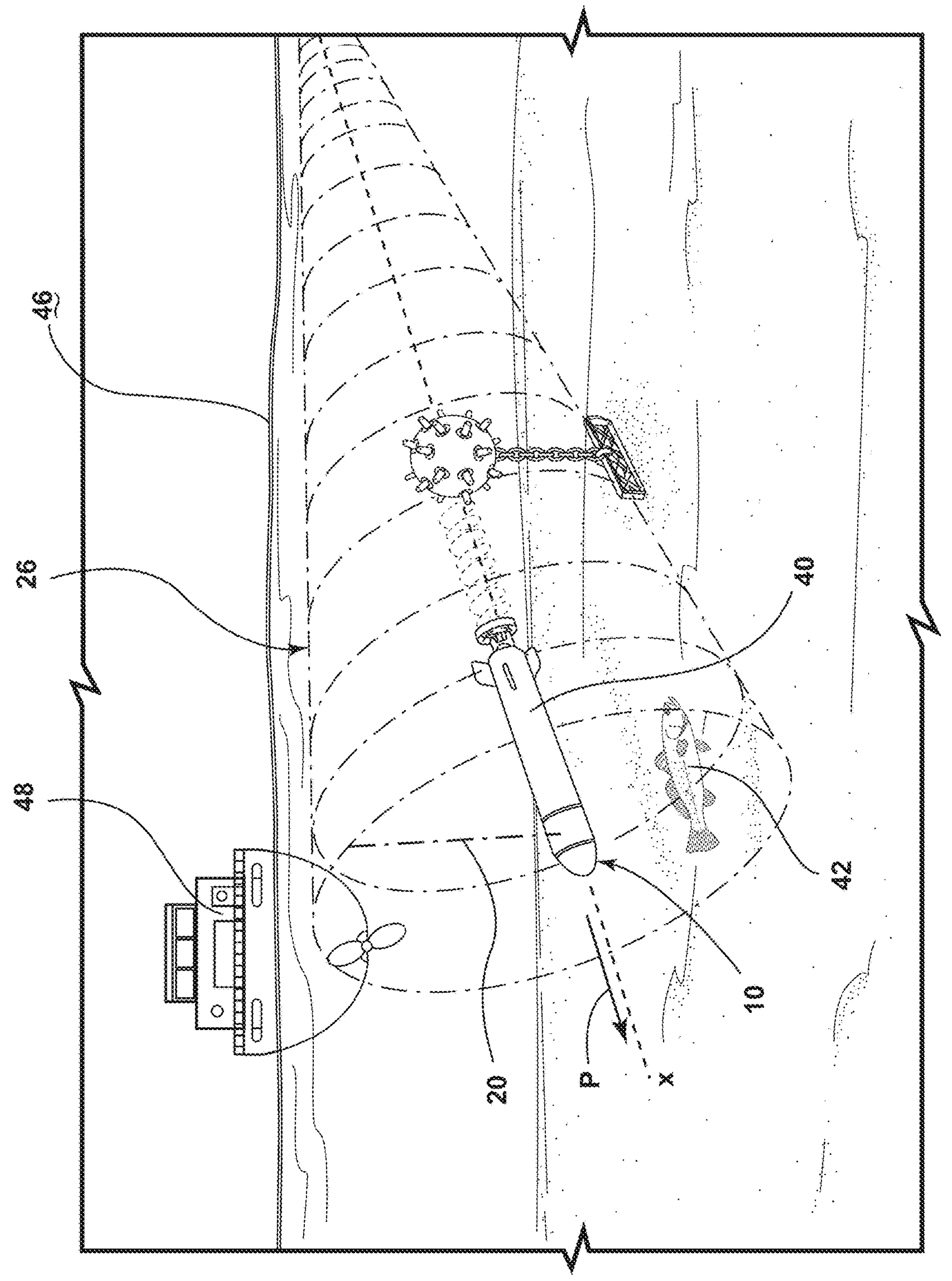
FIG. 7 illustrates a side perspective underwater view of a carry assembly including a cylindrical point cloud.

Referring now to FIG. 6, the imaging system 10 is shown including the parameters and resolution information of the monogon laser scanner 88 configured to produce the 3D point cloud 26 of FIG. 7. Specifically, angular resolution ($\Delta\phi$) is calculated using the formula $\Delta\phi=\omega\cdot\Delta t_{p2p}$, while the cross-track resolution ($\Delta x$) is calculated using the formula $\Delta x=r\cdot\Delta\phi$. Depth resolution ($\Delta r$) may be calculated using the formula $\Delta r=\frac{1}{2}c\cdot\Delta t_{samp}$, and along-track resolution ($\Delta z$) $\Delta r=\frac{1}{2}c\cdot\Delta t_{samp}$ may be calculated using the formula $\Delta z=v\cdot\Delta t_{rot}\cdot\Delta\phi=\omega\cdot\Delta t_{p2p}$.

Figure 8A:
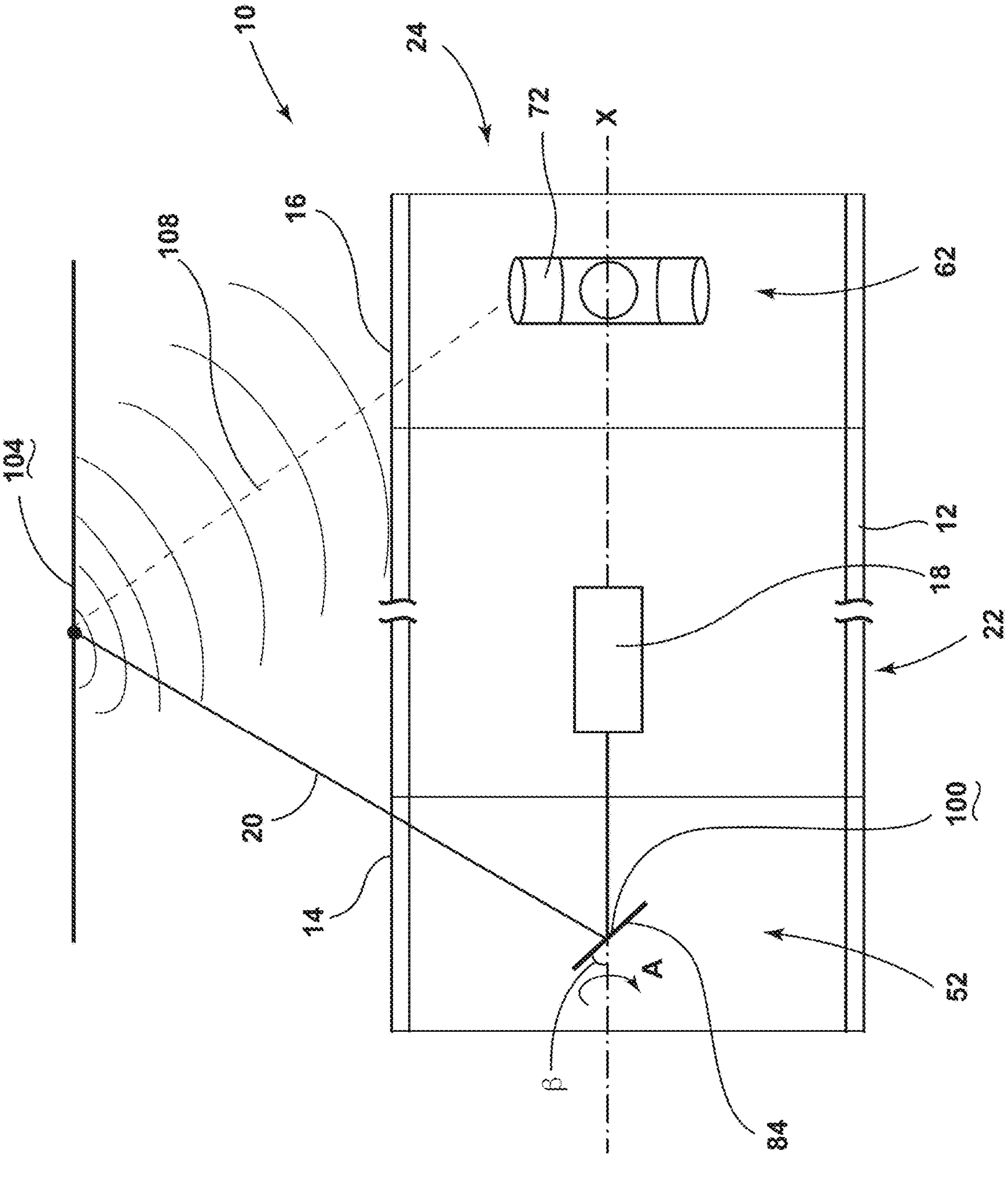
FIG. 8A is a schematic cross section of an imaging system with emitted light contacting an external surface.
Figure 8B:
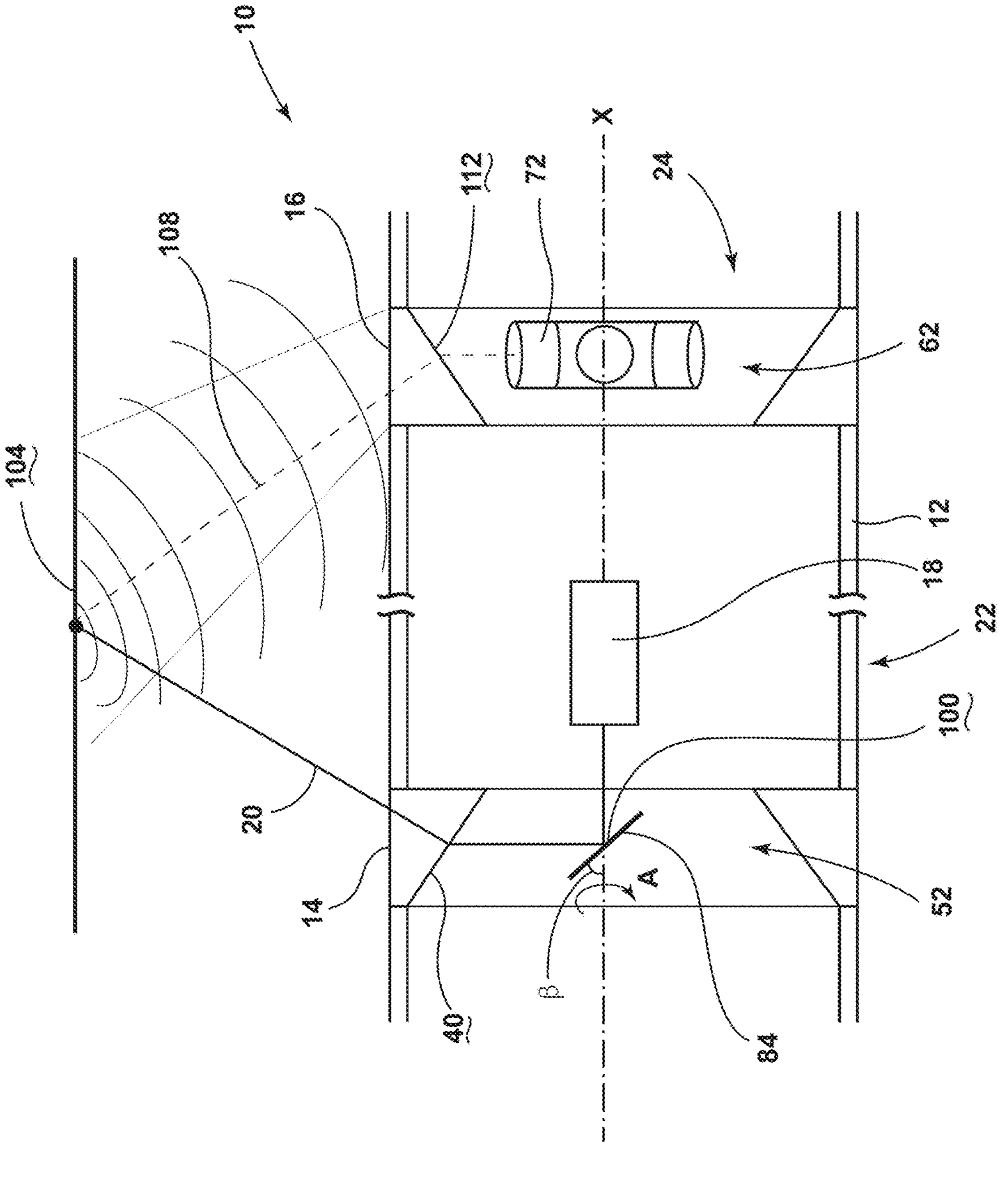
FIG. 8B is a schematic cross section of an imaging system having angled surfaces within transparent portions adjusting the direction of emitted light exiting the system to contact an external surface.

In application, the imaging system 10 will acquire data in all directions and will work by generating a cylindrical 3D point cloud 26 along the path of the housing 12 (see FIG. 7). As shown in FIGS. 7-8B, in generating the cylindrical 3D point cloud 26, the light source 18 emits the emitted light 20, as discussed in more detail elsewhere herein. The light source 18 may be configured as a laser. For example, the light source 18 may be configured as a pulse laser such that the emitted light 20 is emitted in optical pulses. As shown in FIGS. 8A and 8B, the emitted light 20 is directed from the light source 18 toward the monogon 84 and redirected by at least one surface 100 of the monogon 84 to pass through a transparent portion 14, 16 of the housing 12 and outward of the housing 12. It will be understood that the configuration shown is exemplary only and that the direction of the emitted light 20 may be adjusted by changing an angle β of the surface 100 measured relative to the axis of motion x. When the emitted light 20 contacts an external surface 104, returned light 108 is directed back at the system 10. The returned light 108 passes back through the transparent portion 14, 16 of the housing 12 and is received by the receiver 24.

In various examples, as shown in FIG. 8B, the transparent portions 14, 16 of the housing 12 may incorporate an angled surface 110, 112 to redirect the emitted light 20 from the transmitter 22 and/or the receiver 24 to maximize the collection efficiency. In other words, in various examples, the emitted light 20 is directed from the light source 18 toward the monogon 84 and redirected by at least one surface 100 of the monogon 84 to pass through a transparent portion 14, 16 of the housing 12. It will be understood that the configuration shown is exemplary only and that the direction of the emitted light 20 may be adjusted by changing an angle β of the surface 100 measured relative to the axis of motion x. The angled surface 110, 112 of the transparent surface 14, 16 redirects the emitted light 20 outward of the housing 12. When the emitted light 20 contacts an external surface 104, returned light 108 is directed back at the system 10. The returned light 108 passes back through the transparent portion 14, 16 of the housing 12. Where both transparent portions 14, 16 have an angled surface 110, 112, the returned light 108 may be redirected by the angled surface 110, 112 to be received by the receiver 24. It will also be understood that the angled surface 110, 112 may be adjusted to adjust the redirection of the emitted light 20 and/or the returned light 108 without departing from the scope of the present disclosure.

Distance or depth information is then determined via the time of flight of individual optical pulses of the emitted light 20 from the light source 18. The information is used to generate the cylindrical 3D point cloud along the path of movement of the housing 12. The movement may be caused by the forward movement of the carrying assembly 40 (e.g., the AUV or similar underwater platform or towfish). It is understood that any other method commonly used in LiDAR system for determining the propagation distance may also be utilized.

Figure 9A:
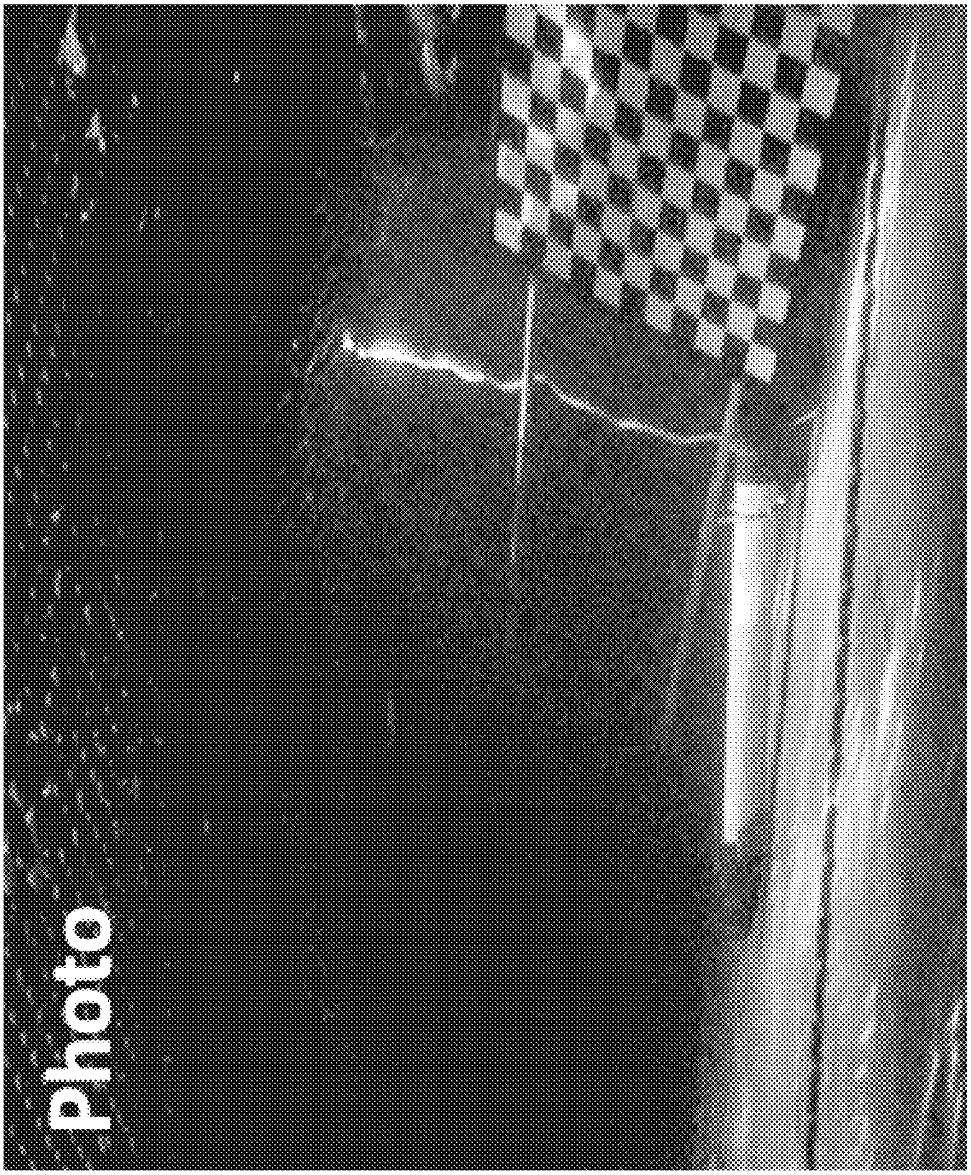
FIG. 9A is a photograph of a tank environment.
Figure 9B:
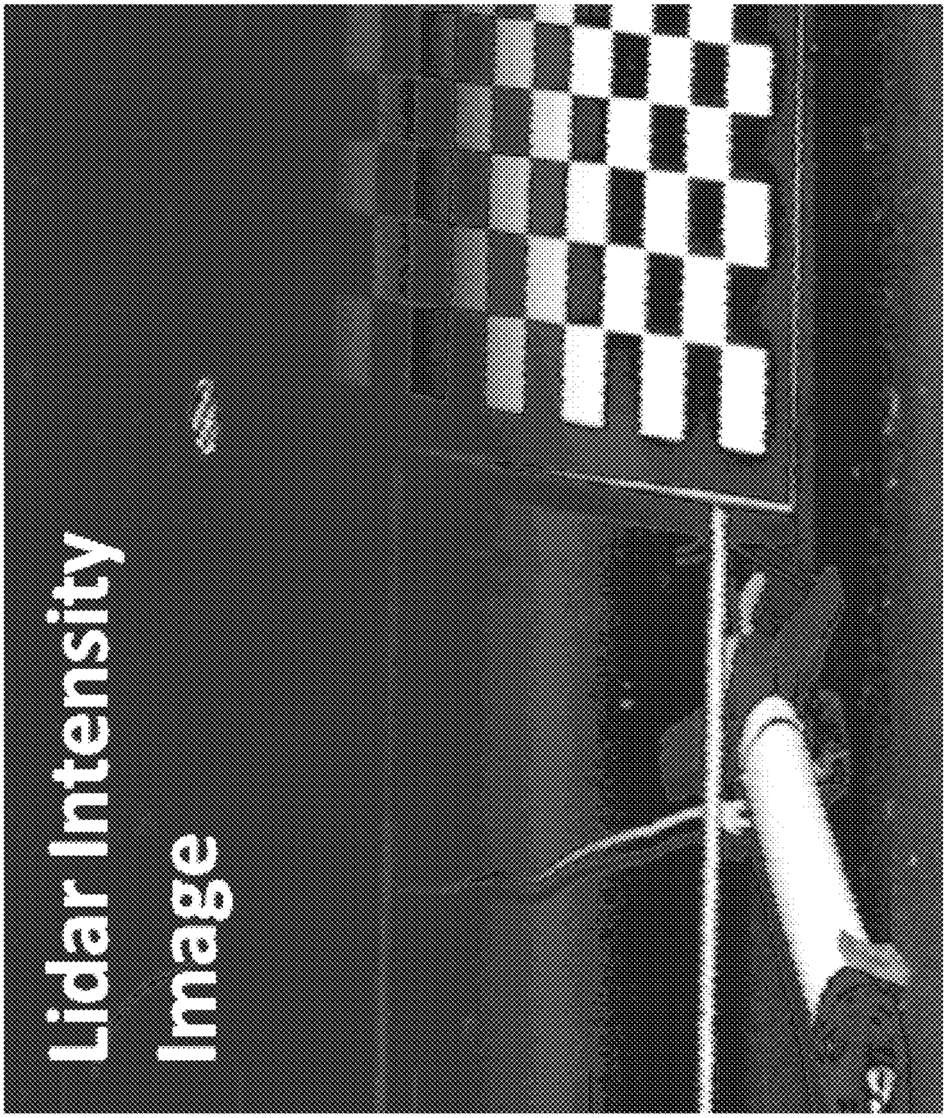
FIG. 9B is a Lidar Intensity Image of the tank environment of FIG. 9A.
Figure 9C:
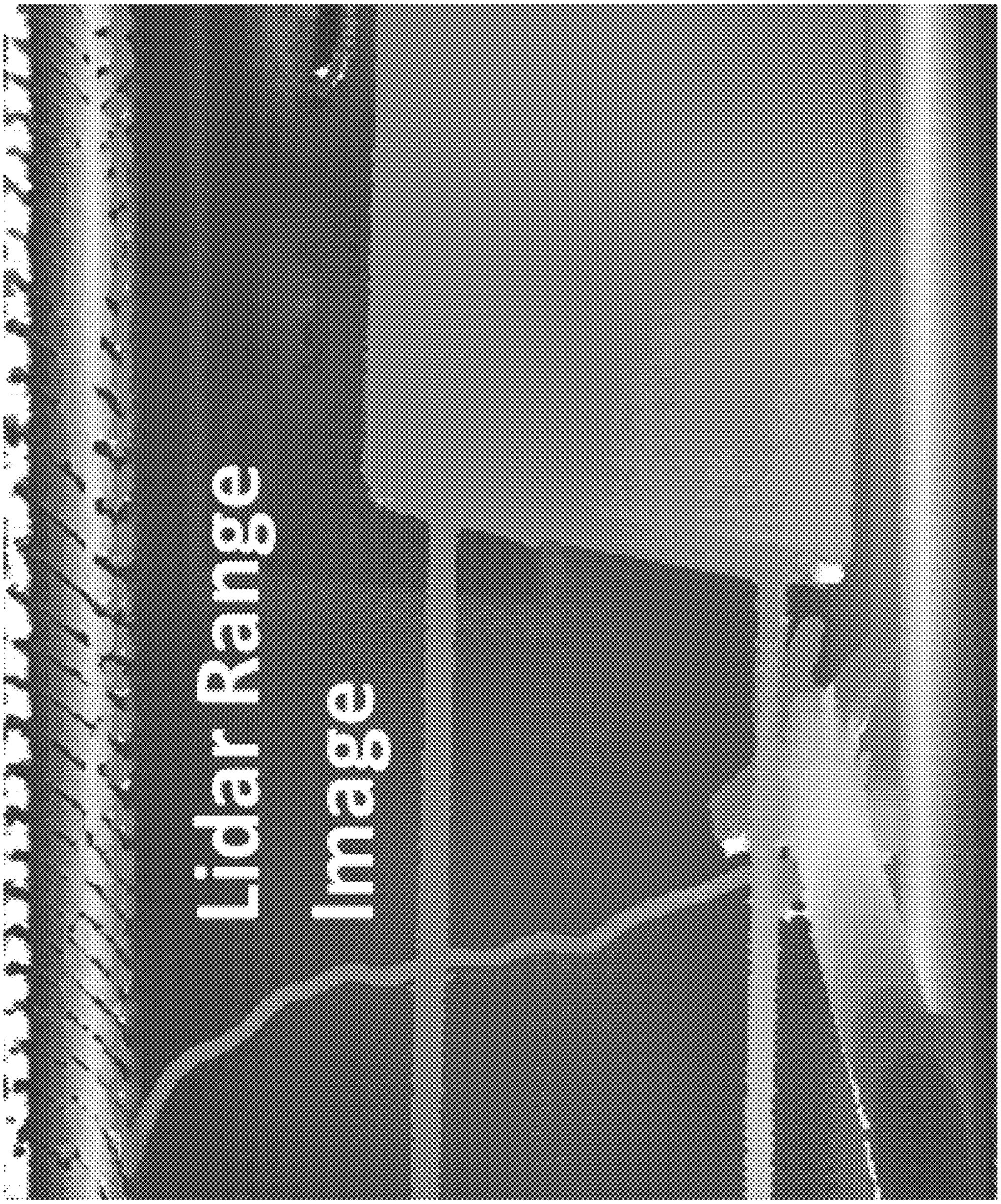
FIG. 9C is a Lidar Range Image of the tank environment of FIG. 9A.
Figure 9D:
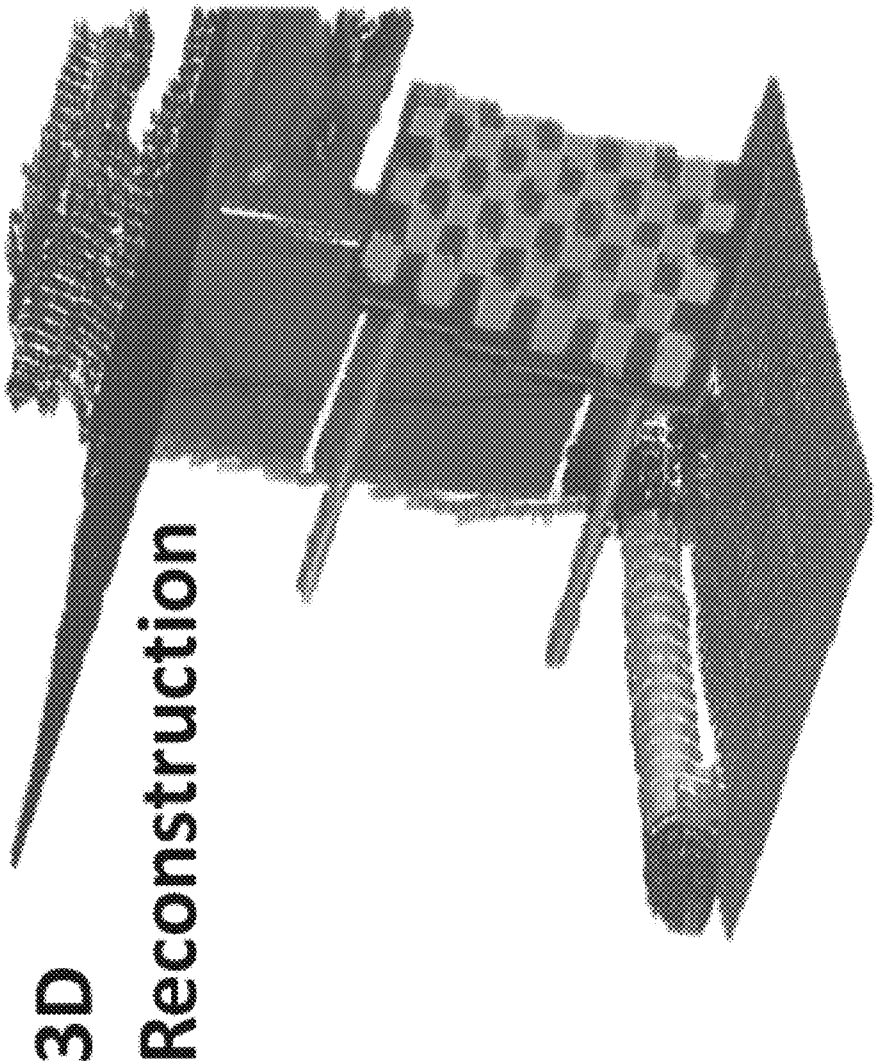
FIG. 9D depicts a three-dimensional reconstruction of the tank environment of FIG. 9A taken using an omnidirectional imaging system.

Exemplary images of a scanned environment using the imaging system 10 are shown in FIGS. 9A-9D. FIG. 9A depicts a scanned environment via a photograph. FIG. 9B depicts a LiDAR intensity image of the same scanned environment, and FIG. 9C depicts a LiDAR range image of the same scanned environment. FIG. 9D shows the 3D reconstruction produced using the cylindrical 3D point cloud 26 of the imaging system 10 disclosed herein.

Referring now to FIGS. 1-8B, in application, the receiver 24 may be adjusted to optimize the application of the imaging system 10. For example, if the receiver 24 comprises a circular assembly a of a plurality of detectors 72, the sensitivity of each of the individual detectors 72 can be adjusted to compensate for the expected range to the target. For example, if the housing 12 is relatively close to the seafloor 44, the detector(s) 72 pointing down would have lower sensitivity compared to the detector(s) pointing up to compensate for the larger signal from the sea floor compared to objects on the surface. Alternatively, if the receiver 24 is a synchronized monogon 80 used to collect the emitted light 20, the sensitivity of the single detector 72 can be varied in time to have lower sensitivity when the emitted light 20 is collected from regions of high return depending on the angle of the receiver monogon 80. This again allows the detection of distant and presumably fainter objects with higher sensitivity without saturating the detector 72.

Depending on the separation between the transmitter 22 and the receiver 24, and the distance to the target (e.g., the target object 42, 48, the seafloor 44, etc.), the direction of the outgoing emitted light 20 and the field of the receiver 24 may be adjusted to maximize the photon collection efficiency. To overlap the field of view with the position at which the emitted light 20 intersects the target, the angle of the monogons 80, 84 can be adjusted by installing monogon mirrors with face angles other than 90° in the transmitter 22 as well as in the receiver 24 if the receiver 24 is a synchronized monogon 80.

The imaging system 10 adds to the capability of a LiDAR system for underwater vehicles by allowing a 360 degree illumination and field of view. This is of particular interest in the three-dimensional underwater environment where objects of interest can be found in any direction. The imaging system 10 is well suited to collect bathymetric data in shallow water where pressure changes due to wave action can easily skew the depth sensor of an AUV. As previously discussed with reference to FIG. 1, the 360 degree field of view of the imaging system 10 allows the imaging system 10 to detect the seafloor 44 as well as the sea surface 46. This allows the imaging system 10 to provide data about the height of the water column without needing to resort to pressure measurements.

Furthermore, the imaging system 10 may be used to navigate in and inspect harbor environments where target objects 44, 48 can be at the bottom, on the surface, or suspended in mid-water. Similarly, the imaging system 10 can be used to inspect oil rigs, which again require an omnidirectional imaging system in order to capture the entire structure. Operating in deep water, the imaging system 10 can investigate thin layers of suspended particles that often form in the ocean, whether these layers are above or below the housing 12. Other examples of applications for the imaging system 10 include the mapping of shallow water regions with or without ice cover. In these cases, the imaging system 10 can measure the wave high or the ice/water interface with respect to the seafloor using the same transmitter 22 and receiver 24.

In other words, the imaging system 10 provides a host platform with quantitative awareness of its surrounding environment by measurement time-of-flight (TOF) of reflections from hard surfaces within its 360° field of view, as well as measuring the time-resolved backscattering throughout the water column. The imaging system 10 has several unique applications for which traditional LiDAR sensors with a finite field of view are not well suited.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for use on a vehicle, comprising:
moving a vehicle in a direction along an axis of motion of the vehicle;
emitting, with a transmitter, light through at least one transparent portion of a housing of the vehicle at a 360 degree scanning angle range measured about an axis of motion of the vehicle, the at least one transparent portion extending entirely around the housing;
receiving, with a receiver, the emitted light; and
generating a cylindrical 3D point cloud centered along a path of the vehicle as the vehicle moves in the direction along the axis of motion.

2. The method of claim 1, wherein the vehicle is an underwater vehicle, wherein the housing forms a hull of the underwater vehicle, and wherein the transparent portion forms a portion of the hull.

3. A vehicle having an omnidirectional imaging system, comprising:
a housing including at least one transparent portion extending entirely around the housing;
a light source configured to produce emitted light;
a transmitter configured to direct the emitted light outward of the housing through the at least one transparent portion at a 360 degree scanning angle range measured about an axis of motion of the vehicle; and
a receiver configured to receive the emitted light and generate a cylindrical 3D point cloud centered along a path of the vehicle as the vehicle moves in a direction along the axis of motion.

4. The vehicle of claim 3, wherein the transmitter includes at least one monogon laser scanner configured to rotate about the axis.

5. The vehicle of claim 3, wherein the transmitter includes at least one lens configured to redirect the emitted light toward a monogon of the at least one monogon laser scanner.

6. The vehicle of claim 3, wherein the receiver includes a plurality of detectors positioned in a circular arrangement about the axis.

7. The vehicle of claim 6, wherein the plurality of detectors are electronically steered and are configured to provide a 360 degree field of view by overlapping the field of view of each of the plurality of detectors.

8. The vehicle of claim 6, wherein a sensitivity of each of the plurality of detectors is configured to be adjustable.

9. The vehicle of claim 3, wherein the receiver includes:
a second synchronized monogon; and
a single detector, wherein the second synchronized monogon is configured to direct the emitted light to the single detector.

10. The vehicle of claim 9, wherein a sensitivity of the single detector is configured to be adjustable based on the angle of the second synchronized monogon.

11. The vehicle of claim 3, wherein the at least one transparent portion of the housing includes an angled surface configured to redirect the emitted light.

12. The vehicle of claim 3, wherein the transmitter and the receiver are arranged in a monostatic arrangement.

13. The vehicle of claim 3, wherein the transmitter and the receiver are arranged in a bistatic arrangement.

14. The vehicle of claim 13, further comprising:
one or more electronic components configured to wirelessly transmit one of power and data.

15. The vehicle of claim 3, wherein the vehicle is an underwater vehicle, wherein the housing forms a hull of the underwater vehicle, and wherein the transparent portion forms a portion of the hull.

16. A vehicle having an omnidirectional imaging system, comprising:
a housing having at least one transparent portion extending entirely around the housing;
a light source;
at least one monogon laser scanner configured to rotate about an axis of motion of the housing, wherein the at least one monogon laser scanner is configured to redirect emitted light from the light source outward through the at least one transparent portion to form a 360 degree scanning angle range measured about the axis of motion of the vehicle; and
a plurality of detectors positioned in a circular arrangement about the axis, wherein the plurality of detectors are configured to receive the emitted light from the light source as the vehicle is moved in a direction along the axis of motion and generate a cylindrical 3D point cloud centered along the axis of motion as the vehicle moves in the direction along the axis of motion.

17. The vehicle of claim 16, wherein the at least one rotatable monogon laser scanner and the plurality of detectors are positioned proximate the at least one transparent portion.

18. The vehicle of claim 16, wherein the at least one transparent portion comprises a first transparent portion and a second transparent portion, the first transparent portion positioned proximate the at least one rotatable monogon laser scanner and the second transparent portion positioned proximate the plurality of detectors such that light directed from the monogon laser scanner is directed outward through the first transparent portion and the light received by the plurality of detectors passed through the second transparent portion.

19. The vehicle of claim 16, wherein the light source is a laser configured to emit the emitted light in optical pulses.

20. A vehicle having an omnidirectional imaging system, comprising:
a housing having at least one transparent portion extending entirely around the housing;
a light source;
a first monogon laser scanner configured to rotate about an axis of motion of the vehicle, wherein the first monogon laser scanner is configured to redirect emitted light from the light source outward through the at least one transparent portion to form a 360 degree scanning angle measured about the first axis;

a detector; and a second synchronized monogon configured to direct the emitted light to the detector as the vehicle is moved in a direction along the axis of motion, wherein the detector is configured to generate a cylindrical 3D point cloud centered along the axis of motion as the vehicle moves in the direction along the axis of motion.

21. The vehicle of claim 20, wherein the first monogon laser scanner, the second monogon, and the detector are positioned proximate the at least one transparent portion.

22. The vehicle of claim 20, wherein the at least one transparent portion comprises a first transparent portion and a second transparent portion, the first transparent portion positioned proximate the first monogon laser scanner and the second transparent portion positioned proximate the second monogon and the detector.

23. The vehicle of claim 20, wherein the light source is a laser configured to emit the emitted light in optical pulses.

* * * * *